Patented Aug. 10, 1943

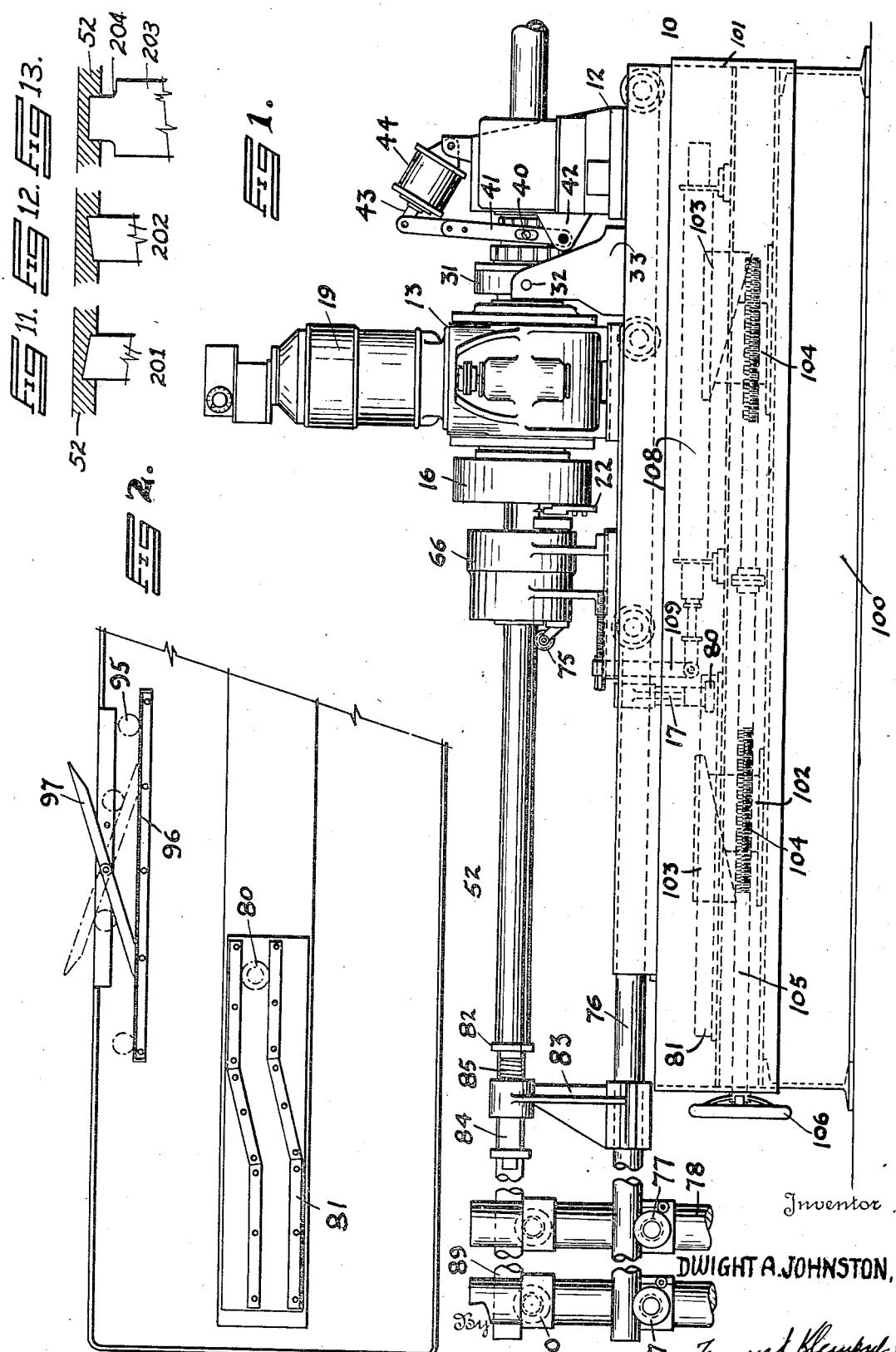
Aug. 10, 1943.  D. A. JOHNSTON  2,326,463
AUTOMATIC TUBE CUTOFF
Filed April 2, 1941  4 Sheets-Sheet 1
Inventor
DWIGHT A. JOHNSTON,
By Francis J. Klempay
Attorney Aug. 10, 1943.  D. A. JOHNSTON  2,326,463
AUTOMATIC TUBE CUTOFF
Filed April 2, 1941  4 Sheets-Sheet 2
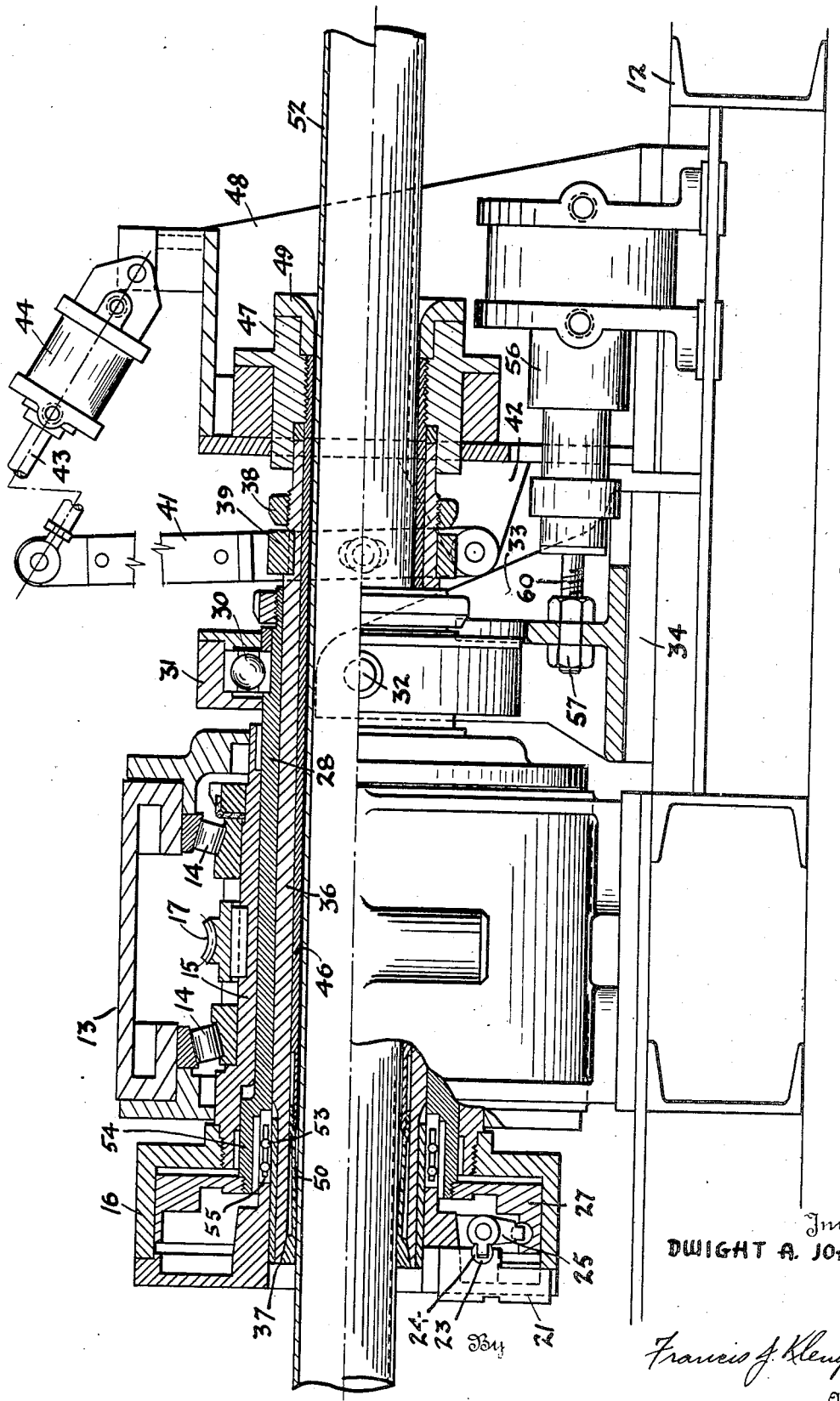
Inventor
DWIGHT A. JOHNSTON
By Francis J. Klempay
Attorney

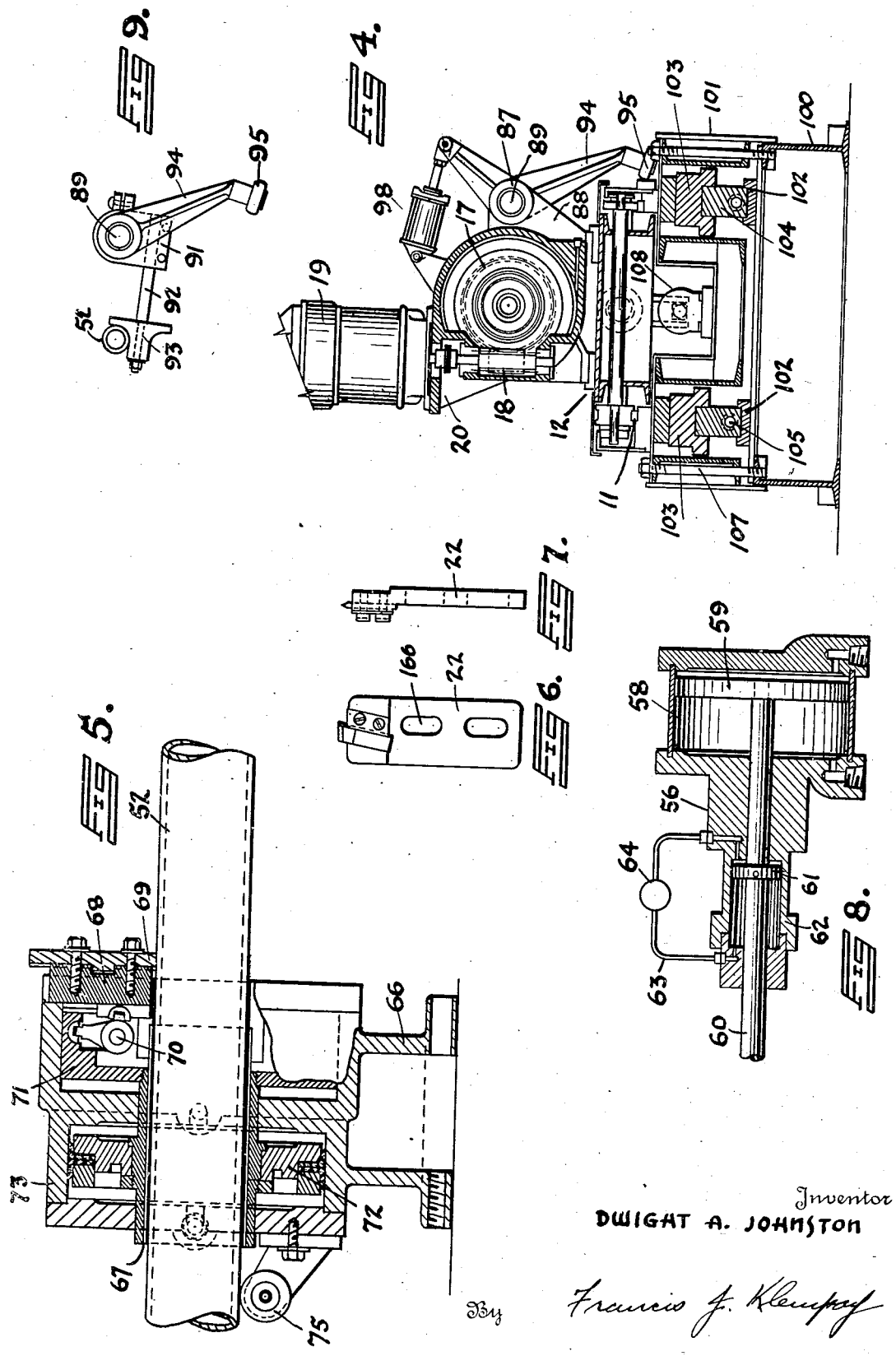

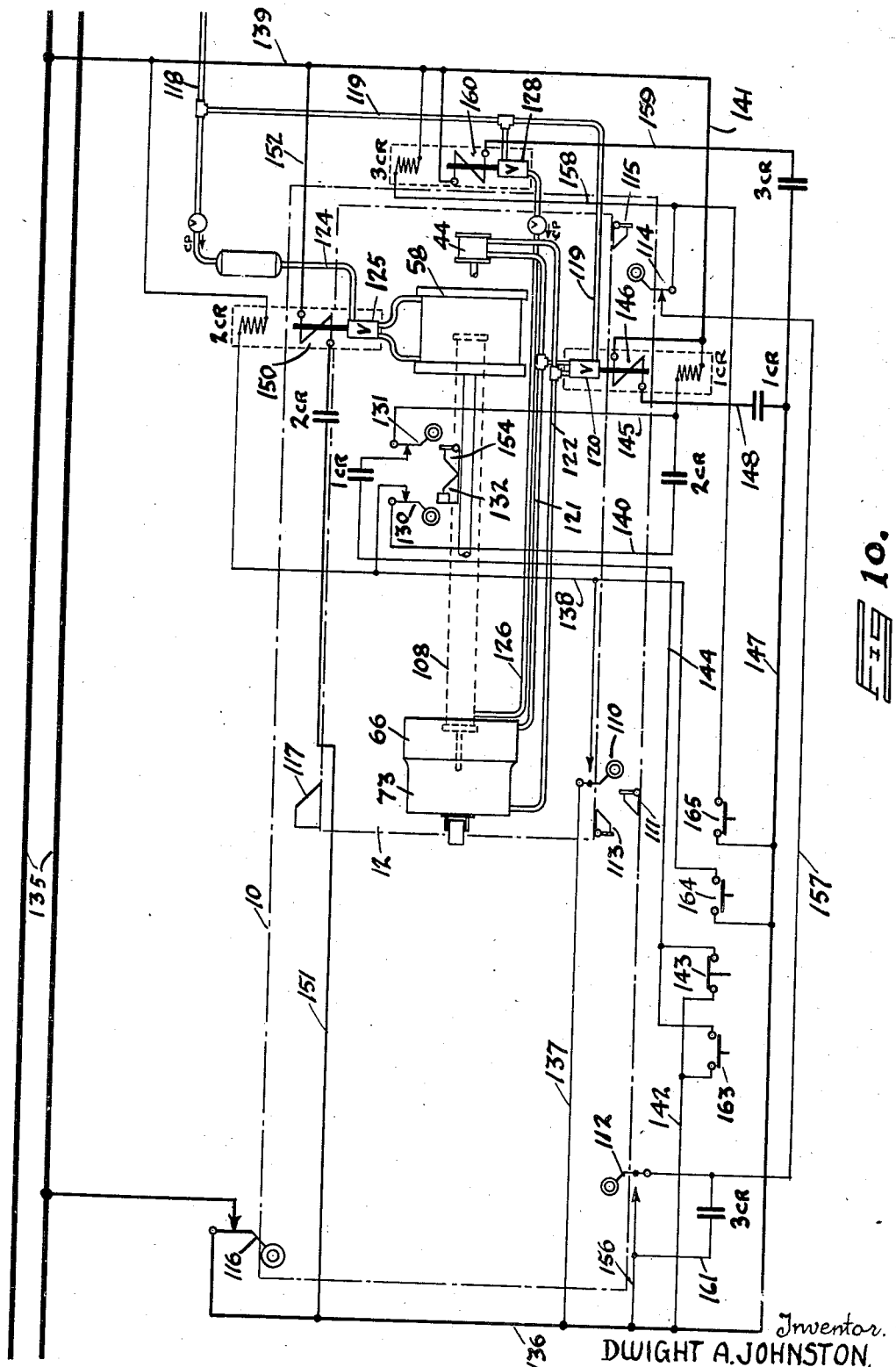

2,326,463

UNITED STATES PATENT OFFICE 2,326,463

AUTOMATIC TUBE CUTOFF

Dwight A. Johnston, Youngstown, Ohio, assignor to McKay Machine Company, Youngstown, Ohio, a corporation of Ohio Application April 2, 1941, Serial No. 386,506

13 Claims. (Cl. 164—60)

This invention relates to an apparatus for automatically severing predetermined lengths of pipe or tube as the pipe or tube moves continuously along its longitudinal axis as, for example, when it issues from a continuous tube welding mill. More particularly the invention relates to certain improved features of construction and methods of operation of an apparatus which is operable to sever predetermined lengths from continuously moving tube stock which method and apparatus is capable of severing stock of widely varying diameters including heavy pipe or tube of large size.

Accordingly, the primary object of the invention is the provision of an apparatus of the kind mentioned which is readily adjustable and interchangeable for cutting tubes of different diameters and to this end the apparatus includes provisions for guiding and clamping tubes of different diameters as well as means to regulate the feed of the severing tools so that such tools may at all times be operated at their most efficient cutting speeds.

Another object of the invention is the provision of an improved arrangement for clamping the tube with respect to the cutting device which arrangement is operative to securely grip the tube on opposite sides of the cutting tools and closely adjacent thereto without requiring any longitudinal movement of the clamping devices relative to the tube being cut.

The invention also includes the provision of means to vary the rotative speed of the cutting tools relative to the tube being cut to compensate for variations in the diameter of the tube. In severing tubes of larger diameters, it should be apparent that if the surface speed of the cutting tools are to be maintained constant, the rotative speed thereof must be decreased. It is well known that the surface speed of metal cutting tools must be kept constant for maximum cutting speed and life of tools. This is accomplished in accordance with the invention by employing a variable speed power source for the cutting tools. Also, means is provided in connection with the cut-off machine to vary the center line of the tube supported thereby to compensate for variations in the tube diameter. For example, if the tube is conveyed to the cut-off machine by a roller conveyer, the distance from the fixed supporting surface of the conveyer to the center line of the tube will vary as the tube diameter varies and therefore the center line of the tube support on the machine must be raised and lowered accordingly.

Further objects of the invention include the provision of a novel gauge head which cushions the tube to a stop relative to the carriage as the tube picks up the carriage in its travel. Provision is also made to prevent unclamping of the tube until the tools are clear of the outer periphery of the tube and immediately upon such unclamping the carriage supporting the cut-off mechanism is automatically returned to its initial starting position. A still further general object of the invention is the provision of an apparatus for the purposes indicated which is rugged in construction, trouble free in service but which nevertheless is operative to cut the tubing to close tolerances of length.

Yet another object of the invention is the provision of an improved arrangement and design of the cutting tools employed to sever the tubing whereby the cut made is clean and sharp and without burrs or ragged edges. Further, the design and operation of the machine is such that the cutting tools employed may be so ground that a radiused or tapered end may be placed on the tube at the time it is severed. Also, it is possible to employ the machine for turning annular grooves or recesses unlimited cross sectional shapes in the tube with or without simultaneously severing the tube.

These and other objects and advantages of the invention will become apparent from a consideration of the following detailed specification and the accompanying drawings wherein there is specifically disclosed a preferred embodiment of the invention.

In the drawings:

Figure 1 is a side view of an apparatus constructed in accordance with the principles of the invention;

Figure 2 is a fragmentary plan view of the base of the apparatus of Figure 1;

Figure 3 is a longitudinal section, partly in elevation of the cutting and clamping head of the apparatus in Figure 1;

Figure 4 is a transverse sectional view of the apparatus;

Figure 5 is a longitudinal sectional view of the outboard tube clamp of the apparatus;

Figures 6 and 7 are plan and side views, respectively, of one of the cutting tool holders utilized in the apparatus;

Figure 8 is a representation of the compound tool feed cylinder of the apparatus;

Figure 9 is a view of a detail of the apparatus;

Figure 10 is a composite piping and wiring diagram of the control system of the apparatus; and Figures 11, 12 and 13 are side views of three cutting tools which may be simultaneously employed in the apparatus.

The tube cut-off machine in its preferred and illustrated embodiment comprises a base 10 having spaced parallel tracks 11 on its upper surface, and a carriage 12 supporting the tube clamping and cutting devices adapted to travel to and fro on the tracks. Referring to Figures 1 and 2, a head 13 is attached to the carriage 12 and journaled therein on the spaced antifriction bearings 14 is a sleeve 15 carrying at its outer end a tool supporting head 16. Sleeve 15 has keyed thereto a worm wheel 17 in mesh with a worm 18 driven by a variable speed A. C. motor 19 supported by a bracket 20 on the head 13.

Slideably guided for radial movement in the head 16 are a plurality of blocks 21 to each of which is bolted a tool holder 22 (Figures 6 and 7). Each block 21 is provided with a chordally disposed cylindrical recess 23 in which is disposed a cylindrical follower 24. A bellcrank lever 25 is pivoted on head 16 for rotation about an axis parallel with the axis of rotation of the follower 24 and one leg of the lever is received within a recess in the follower. A similar lever is positioned in operative relation to each of the blocks 21. The other legs of the levers 25 are pivotally connected with a ring 27 which is slideably received within the hollow head 16. Ring 27 is attached to the outer end of a reciprocable and rotatable sleeve 28 which extends through sleeve 15 and is concentric therewith.

On the opposite end of head 13 from the tool support 16 shaft 28 extends out beyond the head and shaft 15 and to this extended end of shaft 28 is secured a combined radial and thrust bearing 30, the outer race of which is fitted into a collar 31. Collar 31 is provided with a pair of horizontally extending trunnions 32 which are adapted to be received in aligned apertures in a yoke 33 slideably mounted on a base 34 mounted on the carriage frame 12. It should be apparent that upon longitudinal movement of the yoke 33 and consequently of sleeve 28 that the bellcrank levers 27 will be rotated about their respective axes thereby moving the tool slides 21 simultaneously radially inward or outward as the case may be.

Reciprocably but not rotatably mounted within the sleeve 28 is a third sleeve 36 provided at its inner end with a tapered bore 37 and at its outer end (outwardly of the adjacent end of the sleeve 28) with an annular recess 38 in which is received a collar 39 trunnioned at 40 to a lever 41 pivotally mounted at one end to a bracket 42 fixed on the carriage 12. The outer free end of lever 41 is connected with the piston rod 43 of an air cylinder 44. It should be apparent that upon actuation of cylinder 44 the sleeve 36 will be moved either inwardly or outwardly as the case may be. Sleeve 36 surrounds a fourth fixed sleeve 46 which extends outwardly beyond the outer end of sleeve 36 and is screw-threadedly secured to a block 47 carried by a frame 48 fixed on the carriage 12. A guide bell 49 is carried by the outer end of the block 47. To the opposite or inner end of the sleeve 46 is screw-threadedly attached the shank of an expansible collet 50 having longitudinal slots in its end opposite the shank end and an enlarged head 51 at its slotted end which head is provided with a tapered outer surface to complement the tapered bore 37 of the sleeve 36. It should be apparent that by reason of the coacting tapered surfaces of members 36 and 51 inward longitudinal movement of the sleeve 36 will force the fingers of the collet 50 into tight engagement with the tube extending through sleeve 46 thereby clamping the tube to the carriage 12. In the drawings the tube being cut is indicated by reference numeral 52.

The inner end of the nonrotatable sleeve 36 is encased in a hardened steel cylindrical band 53 and a similar band 54 is secured in a bore in the rotatable and reciprocable sleeve 28. Interposed between bands 53 and 54 is a bearing 55 consisting of a plurality of circumferentially and axially spaced balls which provides an antifriction connection for both the longitudinal and rotational movement of the sleeve 28 relative to the sleeve 36.

Yoke 33 is adapted to be reciprocated by the compound air and hydraulic cylinder 56 through an adjustable connection 57 and as shown schematically in Figure 8, compound cylinder 56 consists of an air cylinder 58 having a piston 59 received therein and connected to a rod 60. Also secured to rod 60 is a second piston 61 slideably received in a hydraulic cylinder 62 the opposite ends of which are interconnected by a conduit 63 having an adjustable metering valve 64 interposed therein. By controlling the rate of flow of the hydraulic fluid through conduit 63 the rate of travel of piston 61 and consequently the rate of feed of the tools 22 carried by the blocks 21 may be controlled. Means, not shown, is provided to maintain the opposite ends of the cylinder 62 and the conduit 63 completely filled with hydraulic fluid at all times. The compound cylinder 56 is supported on the carriage 12 and thus provides an integral tool feeding arrangement which is independent of movement of the carriage. This presents important advantages in that the best rate of tool feed may be effected for different diameters, thicknesses, and compositions of the tube being cut independently of the rate of travel of the tube.

Also supported on the carriage 12 is a clamp 66 operative to clamp the tube at the side of the cutting tools 22 opposite the collet clamp 50. Clamp 66 is provided with a bore 67 for the passage of tube 52 and slideably mounted for radial movement toward and away from the tube are a plurality of clamp supports 68. See Figure 5. Each of the supports 68 carry a tube engaging clamp 69 and is moved by a bellcrank lever 70 pivotally mounted on the housing of the clamp 66. The other legs of the bellcrank levers are pivotally connected with and adapted to be moved by a sleeve 71 operatively connected with a piston 72 of a fluid pressure cylinder 73. It should be apparent that when fluid pressure, preferably air, is admitted to the outer side of the cylinder 73, the clamps 69 will be brought into pressure engagement with the tube 52 and when pressure is admitted to the opposite end of the cylinder the clamps will be moved radially outward free of the tube. Adjustably secured to the face of clamp assembly 66 opposite the members 69 are three or more circumferentially spaced guide rolls 75 for supporting the tube.

Referring again to Figures 1 and 2, extending outwardly from the front end of the carriage is a rod 76 which is prevented from moving longitudinally with respect to the carriage but which is connected for at least limited rotation therewith and the outer end of the rod is supported by rollers 77 mounted on spaced stanchions 78 on the mill floor independent of the base 10. Keyed to rod 76 is a downwardly extending lever 79 having a cam follower 80 at its lower end. This follower is received in an offset track 31 secured to the base 10 and the operation of the cam is such that as the carriage moves outwardly or to the left as viewed in Figure 1 the rod 76 will be rotated a sufficient distance to move gauge head 82 to one side of the path of travel of the tube 52. Gauge head 82 is supported from a bracket 83 clamped onto rod 76. Gauge head 82 is immediately carried by the outer end of the piston rod of a cylinder 84 which is also of the metering type so that the head 82 will move slowly from an outer tube engaging position to an inner position fixed with respect to the carriage whereby the tube will be cushioned to a positive stop relative to the carriage. A spring 85 moves head 82 to outer position. It should be apparent that since the tube 52 moves to a positive stop relative to the carriage, the interval between the stopped position of gauge 82 and the cutting tools 22 will be uniform in successive operations and consequently the pieces of tubing cut will be of uniform length.

Rotatably mounted in spaced parallel bearings 87 in bracket 88 supported by the carriage 12 is a rod 89 which extends outwardly substantially parallel with rod 76 and has its outer end slideably supported on grooved rolls 90 also mounted on stanchions 78. Rod 89 is adapted to releasably support the tube as it extends outwardly beyond the supporting rolls 75 and to this end a plurality of brackets 91 are clamped to and spaced along the rod, each of the brackets 91 adjustably carrying a laterally extending shaft 92 on the outer end of which is rotatably mounted a flanged roll 93. By moving shaft 92 longitudinally inward or outward of the bracket 91 the flange of roller 93 may be moved laterally to maintain the lateral alignment of different diameters of tube. Brackets 91, being clamped onto rod 89, may be adjusted about the axis of the rod to maintain the vertical alignment of the longitudinal axis of tube of varying diameters. In the position of the parts shown in Figure 9 the tube 52 is supported. If now the rod 89 is rotated counterclockwise as viewed in Figure 9 the tube 52, if already severed, will roll off the supporting rolls 93 to the left. To accomplish this function an arm 94 having a cam follower 95 at its lower free end is keyed to the rod 89, and the follower 95 is adapted to move along a path formed on the base 10 of the machine as indicated in Figure 2. This path is formed by a fixed wall 96 and a spaced swingably mounted gate 97 which is spring biased to the position shown in full lines in Figure 2. Upon outward movement of the carriage the cam follower 95 moves in a straight line, moving gate 97 out of its way, and consequently the rod 89 is not rotated. Upon reversed movement of the carriage, follower 95 rides on the outside of gate 97 consequently rotating rod 89 in the direction required to release the tube 52 from the supporting rolls 93. An air cylinder 98 is provided to hold the follower 95 against its track 96, 97.

To provide means whereby the operating center line of the cut-off machine may be readily raised or lowered to coincide with the geometric center of the tube being conveyed to the machine I construct base 10 of a lower section 100 and an upper section 101 having telescoping relation with the lower section. Slide guides 102 (Figure 4) are attached to lower section 100 and blocks 103 having lower inclined surfaces are secured to upper section 101, one above each of the guides 102. Interposed between members 102 and 103 are wedges 104 which have screw threaded engagement with threaded shafts 105 extending outwardly beyond one end of the base. Each shaft 105 is connected to two wedges 104 so that rotation of the shafts 105 in one direction will move both ends of the telescopic section 101 in unison either upwardly or downwardly as the case may be. Shafts 105 may conveniently be operated by handwheels 106. Lock bolts 107 are provided to rigidly secure the base sections together once the adjustment has been made.

The operation of the cut-off machine specifically disclosed herein is such that the tube itself moves the carriage outwardly along its tube severing stroke while a cushioned air cylinder 108 connected to carriage through link 109 is employed to return the carriage to its initial starting position. Referring to Figure 10, which represents a composite piping and wiring diagram of the control system of the apparatus described above, reference numeral 110 designates a limit switch which is mounted on the carriage 12 and adapted to be operated (closed) by a gate 111 mounted on base 10 as the carriage 12 begins its outward travel. Gate 111 is so constructed that when switch 110 moves in a reverse direction its operating arm will simply override and not close the switch. A second limit switch 112 is carried on the base and is adapted to be momentarily closed by a gate 113 mounted on carriage 12 as the carriage approaches the end of its outward stroke. Gate 113 operates only on the outward stroke and overrides the switch operator as the carriage moves back to its initial position shown in Figure 10. A third limit switch 114 is supported on the base and is adapted to be momentarily closed by a gate 115 supported on carriage 12 as the carriage approaches the end of its return stroke. A fourth limit switch 116 is supported on the base and is adapted to be opened by an operator 117 mounted on the carriage and serves as a safety switch to insure the release of the tube clamps if their normal controlling mechanisms to be hereinafter fully described do not operate to do so.

Fluid under pressure, preferably air, is supplied to the machine through a conduit 118 and from this source of supply a conduit 119 supplies pressure through solenoid operated valve 120 and conduits 121 and 122 to the outboard clamp 66 and simultaneously to the cylinder 44 which operates the collet clamp 50 in a manner described above. Valve 120 is a four-way valve which when de-energized supplies fluid under pressure to one side of the cylinders 44 and 73 in parallel while the opposite ends of the cylinders are open to the atmosphere and when energized the reverse is true. Fluid pressure is also admitted to the cylinder 58 of the compound tool feed cylinder 56 from source 118 through conduit 124 and solenoid operated valve 125 which when energized directs fluid pressure to the right side of cylinder 58 and to the left side thereof when de-energized. Return cylinder 108 is supplied with fluid pressure through conduit 126 and solenoid operated valve 128.

In addition to the limit switches mentioned above, the apparatus includes a pair of normally closed limit switches 130 and 131 mounted on the carriage 12 and adapted to be alternately opened by an operator 132 carried by the slideable tool feed yoke 33. Electrical power is supplied to the control system through lines 135 and safety switch 116 and a control circuit may be traced from one side of line 135 through safety switch 116, conductor 136, conductor 137, limit switch 110, conductor 133, relay coil 2CR, and conductor 139 back to the other side of line 135. In the operation of the machine, as the leading end of the tube 52 engages the gauge head 82 and deflates cylinder 84 against a positive stop the carriage 12 begins to move outwardly and switch 110 is momentarily closed by engagement with gate 111. Energization of relay 2CR closes its operated contacts 2CR and simultaneously therewith the following circuit is established: conductors 136 and 137, switch 110, conductor 138, normally closed limit switch 130, conductor 140, contacts 2CR, relay coil 1CR, conductor 141, and conductor 139. Energization of relay coil 1CR closes its associated contacts 1CR and a holding circuit for relays 1CR and 2CR is thereby established as follows: conductors 136 and 142, normally closed manual unclamp switch 143, conductor 144, contacts 1CR, normally closed limit switch 131, conductor 145, contacts 2CR, conductor 140, normally closed limit switch 130, coil 2CR, and conductor 139. For coil 1CR the holding circuit branches after conductor 145 and reaches conductor 139 through conductor 141.

Valve 120 is operated by solenoid 146 which is in series with power line 135 through conductors 136 and 147, contacts 1CR, and conductors 148, 141, and 139. Valve 125 is operated by solenoid 150 which is in series with the power supply through conductors 136 and 151, contacts 2CR, and conductors 152 and 139. Therefore, upon start of the outward movement of carriage 12 and the consequent closing of switch 110 the clamps 50 and 66 are actuated and simultaneously therewith the tool feeding cylinder 58 is actuated to move the tools inwardly to effect the cutting of the tube. It is understood, of course, that the motor 19 remains energized and that the tools are continuously revolving about the periphery of the tube. By means of the holding circuits described above the tube clamp and tool feed cylinders remain operative after switch 110 passes gate 111 and is again opened. By reason of the use of the metering valve 64 which limits the rate of tool feed the tube clamps will be fully actuated before the tools are brought into engagement with the work.

Outward movement of the carriage and inward movement of the tools now continues and when the tools have advanced a sufficient extent to sever the tube, as gauged by the position of the yoke 33, the operator 132 opens limit switch 130 and the holding circuit for relay coil 2CR, as outlined above, is interrupted and solenoid 150 is deenergized due to opening of contacts 2CR in line 151 and fluid pressure is admitted to the left side of cylinder 58 to move the cutting tools radially outward of the tube. When the cutting tools are clear of the outer periphery of the tube the gate 154 of operator 132 opens limit switch 131 thereby de-energizing relay 1CR which by opening contacts 1CR in line 148 de-energizes solenoid 146 thereby causing the tube clamps to move to their outer free positions. Gate 154 overrides switch 131 when slide 33 is moving in tool feeding direction. It should be apparent that the control of the clamps and of the cutting tool movements is such that the clamps cannot be released until the tools are out of the path of travel of the tube stock. This eliminates any danger of injury to the cutting head mechanism by continued movement of the tube.

Upon retraction of the cutting tools and release of the tube the carriage will continue its outward free movement until gate 113 closes switch 112 at which time a circuit including conductors 157, normally closed limit switch 114, conductor 158, relay 3CR, and conductor 139 will be established and by closing the associated contacts 3CR a circuit including conductors 136 and 147, contacts 3CR, conductor 159, and solenoid 169, will be established, thereby actuating valve 128 and admitting fluid pressure to the outer end of cylinder 108 to move the carriage back to its initial starting position. It should be understood that solenoid 160 operates valve 128. Upon energization of relay 3CR a holding circuit including conductors 156 and 161, contacts 3CR, and conductor 157, is established to insure continuity of reversed movement of the carriage. As the carriage approaches its initial starting position, gate 115 opens limit switch 114 interrupting 3CR and its holding circuit thereby de-energizing solenoid 160. Cylinder 108 is cushioned so that as the carriage approaches the end of either of its strokes it will be uniformly decelerated before it is stopped. In addition to the automatic controls described above, the general control system for the apparatus includes manually operatable switches 163, 164, and 165 for clamping the tube, for feeding the tools, and for returning the carriage, respectively. If, during normal operation of the apparatus the normal controls do not operate to release the tube clamps or to return the carriage to its initial starting position, operator 117 will move against switch 116 and hold the same in open position thereby de-energizing the tube clamps to allow the tube to pass through the apparatus without injury thereto.

The tube is severed and the carriage is returned in the manner described above and during the cutting operation the outer end of the tube is supported by the rollers 93 as aforesaid. As the carriage begins its return movement the severed tube is supported entirely on the rolls 93 and after the line of cut is free of the clamp 66 and the rolls 75, rod 89 carrying rolls 93 is rotated by gate 97 and the severed length of tube rolls off of the ends of the supporting rolls 93 onto a conveyer, chute, or other support. As the carriage returns, arm 17 moves target 82 back into position to be engaged by the next succeeding leading end of the tube.

It should thus be apparent that I have provided an improved apparatus which accomplishes the objects initially set out. The apparatus is simple and rugged in design and is operative to cut heavy pieces of large diameter pipe to accurate lengths. The apparatus may be readily changed over to cut pipe or tubing of different diameters and in accordance with the preferred and illustrated embodiment of the invention this may be accomplished by interchanging guide bell 49, collet 50, by adjusting tool holders 22 as allowed by their elongated apertures 166, by adjusting clamps 69 as allowed by similar apertures and by adjusting the radial position of the supporting rolls 75. In the drawings, the tube 52 is shown as being of maximum diameter. The telescopic base 10 together with wedges 104 provide a simple means whereby the pass axis of the apparatus may be readily raised or lowered to coincide with the longitudinal axis of the tube being delivered to the cut-off machine. Means is provided to vary the rotative speed of the tools about the tube and to vary the rate of inward movement or rate of feed of the tools towards the center of the tube whereby the range of usefulness of the apparatus is materially increased.

In Figures 11, 12 and 13 reference numerals 201, 202 and 203 indicate three tools which may be simultaneously employed in the apparatus, each being supported by a holder 22 (Figures 6 and 7) for cutting the tube stock 52. The tools are arranged in the order indicated with the cutting edges of tools 201 and 202 oppositely inclined as shown in the drawings and with the cutting edge of tool 203 parallel with the principal axis of the tube being cut. The width of the cutting space measured in a direction parallel with the principal axis of the tube is identical for each of the tools and it should be understood that in effecting the severing of the tube, a length equal to the width of the tools will be machined out of the tube stock. In operation the tool 201 first cuts cleanly along one edge of said length and immediately thereafter the tool 202 cuts cleanly along the other edge of said length while the purpose of 203 is to remove the material remaining between the two spaced grooves cut by the tools 201 and 203. Experiments have shown that by the use of the three tools shown in the apparatus of the invention an absolutely clean severing cut may be quickly effected in the tube stock without damage to the adjacent ends of the severed lengths of tube and without the formation of burrs or ragged edges on either the inner or outer surface of the tube. If it is desired to radius the edges of the severed lengths of tube, tool 203 may be provided with radiused cutting shoulders 204 which upon continued inward movement of the tools will engage and radius the adjacent ends of the tube. This construction and operation is possible since the apparatus employs means to positively limit the inward positions of the tools, and such inward limiting positions may be minutely adjusted. It should also be understood that by reason of this characteristic, various styles and designs of cutting tools may be employed and such tools may be operative simply to turn annular grooves or recesses in the stock without severing the stock if such operation is desired.

The above specifically described embodiment of the invention should be considered as illustrative only as obviously many changes may be made therein without departing from the spirit or scope of the invention. References should therefore be had to the appended claims in determining the scope of the invention.

What I claim is:

1. In a machine for severing predetermined lengths from longitudinally moving tubing comprising in combination a base, a carriage mounted on said base for movement along with said tubing, a cutting tool revolvably mounted on said carriage for movement about the longitudinal axis of said tubing, means to move said tool towards said axis to effect the cutting of said tubing, means to prevent longitudinal movement of said tubing relative to said cutter during the cutting operation, means supported wholly on said carriage to feed said cutting tool inwardly toward said axis, said last mentioned means comprising a power operating mechanism, and means to vary the rate of operation of said mechanism independently of the rate of travel of said carriage.

2. In a machine for severing predetermined lengths from longitudinally moving tubing comprising in combination a base, a carriage mounted on said base for movement along with said tubing, a cutting tool revolvably mounted on said carriage for movement about the longitudinal axis of said tubing, means to move said tool towards said axis to effect the cutting of said tubing, means to prevent longitudinal movement of said tubing relative to said cutter during the cutting operation, means supported wholly on said carriage to feed said cutting tool inwardly toward said axis, said last mentioned means comprising a fluid pressure operated motor, a hydraulic piston and cylinder connected with said motor, the opposite ends of said cylinder being filled with hydraulic fluid, a conduit interconnecting said ends, and an adjustable metering valve in said conduit.

3. In a machine for severing predetermined lengths from tubing continuously advancing longitudinally the combination of a base, a carriage mounted on said base for movement along with said tubing, a cutting tool revolvably mounted on said carriage for rotation about the longitudinal axis of said tubing, means to move said tool radially inward to effect the cutting of the tubing, means to prevent relative longitudinal movement between said tool and tubing during the cutting operation, means supported wholly on said carriage and operable independently of the rate of travel of said carriage to vary the rate of radial travel of said cutting tool, and means operable upon said tool attaining a predetermined inward position to reverse the operation of said tool feeding means and to render inoperative said means to prevent relative longitudinal movement between said tool and tubing.

4. In a machine for severing predetermined lengths from tubing continuously advancing longitudinally, the combination of a base, a carriage mounted on said base for movement along with said tubing, severing means on said carriage operative to sever said tubing during such forward movement of said carriage, means to move said carriage along with said tubing comprising a support extending outwardly from said carriage, said support including a member adapted to be engaged by the advancing end of said tubing, said member being collapsible in timed relation to a positive stop whereby the impact of said tubing end against said member will be cushioned and the distance between said member and severing means during at least a portion of such forward travel will be uniform in succeeding lengths of tubing.

5. Apparatus according to claim 4 further characterized in that said collapsible member includes a cylinder and piston, fluid filling the end of said cylinder on the opposite side of said piston from said severing means, and means to meter the flow of fluid out of said cylinder end.

6. Apparatus according to claim 4 further characterized in that said collapsible member comprises a cylinder and piston, the end of said cylinder on the opposite side of said piston of said severing means being filled with fluid, means to meter the fluid out of said end, means to limit the movement of said piston in a direction away from said severing means, and means to move said piston toward said severing means.

7. In a machine for severing predetermined lengths from tubing continuously advancing longitudinally, the combination of a base, a carriage mounted on said base for movement along with said tubing, a cutting tool revolvably mounted on said carriage for rotation about the longitudinal axis of said tubing, a hollow shaft supporting said tool, means to clamp the tubing within said shaft to prevent relative longitudinal movement thereof, said means comprising an inner sleeve fixed at one end to said carriage and carrying a contractible collet at its other end, said collet adapted to be moved into pressure engagement with said tubing and having an outer cam surface, a second sleeve surrounding said inner sleeve and adapted to move longitudinally with respect thereto and having a cam surface to engage the cam surface on said collet whereby longitudinal movement of said second sleeve will contract said collet against said tubing, said hollow shaft surrounding said second sleeve, means to rotate said shaft, and means to move said second sleeve longitudinally.

8. In a machine for severing predetermined lengths from tubing continuously advancing longitudinally, the combination of a base, a carriage mounted on said base for movement along with said tubing, a cutting tool revolvably mounted on said carriage for movement about the longitudinal axis of said tubing, means supported wholly on said carriage to revolve said cutting tool and to feed the same inwardly to effect the cutting of said tubing, said base comprising a lower section and an upper section, and means to raise and lower said upper section relative to said lower section.

9. In a machine for severing predetermined lengths from longitudinally moving tubing the combination of a base, a carriage mounted on said base for movement with the tubing, a cutting tool revolvably mounted on said carriage for movement about the longitudinal axis of said tubing, means to prevent longitudinal movement of said tubing relative to said cutter during the cutting operation, means to move said tool towards said axis during the cutting operation, and means to quickly adjust the innermost limiting positions of said cutting tools simultaneously.

10. Apparatus of the character described comprising in combination a base having a carriage movable thereon, a ring rotatably mounted on said carriage and carrying a tube cutting tool movable radially inward and outward with respect to the axis rotation of said ring, a supporting block on said carriage spaced from said ring along the axis of rotation thereof, a sleeve anchored in said block and extending through said ring, a collapsible tube engaging collet secured to said sleeve, a second sleeve about said first mentioned sleeve and having means to engage and clamp said collet about a tube when moved relative to said first mentioned sleeve, and means engaging said second mentioned sleeve intermediate said ring and block to so move said second mentioned sleeve.

11. Apparatus of the character described comprising in combination a support, a carriage on said support, an apertured block on said carriage, a tube anchored at one end in said block and having attached to its other end a tube clamping collet, a longitudinally slidable sleeve about said tube and having cam means to operate said collet upon sliding movement thereof, and a rotary tube severing assembly journal and rotation about the axis of said first mentioned tube and having a severing tool to engage a tube clamped by said collet.

12. Apparatus according to claim 11 further characterized in that said collet is readily removable from said first mentioned tube whereby collets of different diameters may be interchanged, and a removable guiding bell at the end of said aperture in said block which is opposite the end from which said first mentioned tube projects.

13. Apparatus of the character described comprising in combination a support, a carriage movably supported thereon, a cutting tool revolvably mounted on said carriage for movement about the longitudinal axis of tubing moving along said axis in synchronism with said carriage, means comprising a fluid pressure operated motor mounted on said carriage to move the cutting edge of said tool radially inward toward said axis, means to limit the extent of said inward movement, and means to adjust said limiting means whereby the extent of inward movement of said tool may be varied.

DWIGHT A. JOHNSTON.